US012790441B2

(12) United States Patent
Ahn et al.

(10) Patent No.: US 12,790,441 B2
(45) Date of Patent: Nov. 10, 2026

(54) SILICONE ELASTOMER COMPOSITIONS

(71) Applicants: DOW SILICONES CORPORATION, Midland, MI (US); DOW GLOBAL TECHNOLOGIES LLC, Midland, MI (US)

(72) Inventors: Dongchan Ahn, Midland, MI (US); Elizabeth Santos, Midland, MI (US); Kyle Mcdonald, Midland, MI (US); Nicholas Tomalia, Midland, MI (US); Joseph Sootsman, Midland, MI (US); Zachary Kean, Midland, MI (US); Thomas Peterson, Midland, MI (US)

(73) Assignees: DOW SILICONES CORPORATION, Midland, MI (US); Dow Global Technologies LLC, Midland, MI (US)

( * ) Notice: Subject to any disclaimer, the term of this patent is extended or adjusted under 35 U.S.C. 154(b) by 719 days.

(21) Appl. No.: 18/276,443

(22) PCT Filed: Feb. 8, 2022

(86) PCT No.: PCT/US2022/015592
§ 371 (c)(1),
(2) Date: Aug. 8, 2023

(87) PCT Pub. No.: WO2022/173725
PCT Pub. Date: Aug. 18, 2022

(65) Prior Publication Data

US 2024/0132671 A1 Apr. 25, 2024

Related U.S. Application Data

(60) Provisional application No. 63/147,896, filed on Feb. 10, 2021.

(51) Int. Cl.

| | |
|---|---|
| ***C08G 77/20*** | (2006.01) |
| ***C08G 77/12*** | (2006.01) |
| ***C08J 7/04*** | (2020.01) |
| ***C09D 183/06*** | (2006.01) |
| *C08G 77/00* | (2006.01) |

(52) U.S. Cl.

CPC ............. *C08G 77/20* (2013.01); *C08G 77/12* (2013.01); *C08J 7/0427* (2020.01); *C09D 183/06* (2013.01); *C08G 77/70* (2013.01); *C08J 2369/00* (2013.01); *C08J 2483/05* (2013.01); *C08J 2483/07* (2013.01)

(58) Field of Classification Search

CPC ........ C08G 77/20; C08G 77/12; C08G 77/70; C08G 77/14; C08G 77/80; C08J 7/0427; C08J 2369/00; C08J 2483/05; C08J 2483/07; C09D 183/06; C09D 183/04; C08L 83/04; C08L 83/06

See application file for complete search history.

(56) References Cited

U.S. PATENT DOCUMENTS

| | | | | |
|---|---|---|---|---|
| 3,419,593 | A | 12/1968 | Willing | |
| 3,715,334 | A | 2/1973 | Karstedt | |
| 3,814,730 | A | 6/1974 | Karstedt | |
| 3,989,667 | A | 11/1976 | Lee et al. | |
| 6,605,734 | B2 | 8/2003 | Roy et al. | |
| 7,153,583 | B2 * | 12/2006 | Azechi | C08L 83/04 524/588 |
| 8,343,632 | B2 | 1/2013 | Griswold et al. | |
| 2005/0129956 | A1 | 6/2005 | Rubinsztajn et al. | |
| 2012/0309921 | A1 | 12/2012 | Taniguchi et al. | |
| 2017/0190878 | A1 | 7/2017 | Iimura et al. | |

FOREIGN PATENT DOCUMENTS

| | | | | |
|---|---|---|---|---|
| CN | 107955333 | A | 4/2018 | |
| JP | 5037137 | B2 * | 9/2012 | C08G 77/00 |
| WO | 2020053357 | A1 | 3/2020 | |
| WO | 2021026055 | A1 | 2/2021 | |
| WO | 2021262832 | A1 | 12/2021 | |

OTHER PUBLICATIONS

International Search Report for PCT/US2022/015592 dated Jul. 8, 2022, 3 pages.

Machine assisted English translation of CN107955333A obtained from https://worldwide.espacenet.com/patent on Aug. 2, 2023, 10 pages.

* cited by examiner

*Primary Examiner* — Kumar R Bhushan

(74) *Attorney, Agent, or Firm* — Warner Norcross + Judd LLP

(57) ABSTRACT

The present disclosure relates to curable silicone elastomer compositions having enhanced adhesive properties with respect to a wide variety of substrates (hereafter referred to as "curable silicone elastomer compositions"). Elastomers made by curing the curable silicone elastomer compositions may be adhered to a wide variety of substrates to form composites comprising the elastomers and the substrates. Processes for adhering the elastomers made by curing the curable silicone elastomer compositions to the substrates are also provided. An adhesion promoter, component (D), is provided to enhance adhesion. Component (D) is a polyorganosiloxane having (i) at least one unsaturated group per molecule selected from alkenyl groups and alkynyl groups and (ii) an anhydride functionality and an aromatic functionality, wherein a carbon of the aromatic functionality is separated from a carbon of a carbonyl group of the anhydride by a carbon chain of from 1 to 3 non-aromatic carbon atoms inclusive.

15 Claims, No Drawings

SILICONE ELASTOMER COMPOSITIONS

CROSS-REFERENCE TO RELATED APPLICATIONS

This application is the U.S. National Stage of PCT/US2022/015592 filed on 8 Feb. 2022, which claims priority to, and all advantages of, U.S. Provisional Patent Application No. 63/147,896 filed on 10 Feb. 2021, the content of which is incorporated herein by reference.

The present disclosure relates to curable silicone elastomer compositions having enhanced adhesive properties with respect to a wide variety of substrates (hereafter referred to as "curable silicone elastomer compositions"). Elastomers made by curing the aforementioned compositions, may be adhered to a wide variety of substrates to form composites comprising said elastomers made from the curable silicone elastomer compositions and said substrates. Processes for adhering said elastomers made from the curable silicone elastomer compositions to the substrates are also provided.

Curable silicone elastomer compositions cure to provide silicone elastomer materials (otherwise referred to as silicone rubbers). One suitable cure process is via an addition cure mechanism, otherwise described as a hydrosilylation process using a platinum group catalyst.

Adhesion of addition-curable silicone elastomers, is generally poor on plastics. Traditionally, adhesion of a silicone elastomer can be increased by modifying the silicone matrix or substrate surface, e.g., by priming, and a form of surface activation such as plasma treating, among other methods. The application of primers onto the substrate surfaces was initially utilized to overcome this issue. However, several problems have arisen using methods requiring primers and/or high energy surface pre-treatments, such as irradiation by exposure to plasma, corona, flame, UV, or UV-ozone sources to activate the surface for adhesion.

Primer methods are cumbersome not least because they can result in unreliable productivity, quality control issues and indeed reliability issues for parts/articles being made. Primers also have the disadvantage of often containing volatile organic solvents.

There is therefore a desire to avoid the use of primers if possible and this has latterly been achieved by using self-adhesive silicone elastomer materials which will have satisfactory adhesion without the need for primed surfaces, i.e. they are able to adhere during cure to substrates made from e.g. thermoplastic materials, organic resin based materials or both thermoplastic materials and organic resin based materials with which they are placed in direct contact prior to or during the cure process.

It is known that the adhesion of addition-curable silicone elastomers can be improved by the incorporation of adhesion additives containing reactive functional groups including, but not limited to alkoxy silanes, epoxy and carboxyl groups. However, their use in a variety of applications has been limited due to their inability to form sufficiently strong adhesive bonds with plastic and thermoplastic substrates such as polycarbonates. For example, alkoxysilane coupling agents are sometimes used to achieve adhesion to plastics but they are prone to side-reactions such as self-reaction and emit volatile alcohols upon reaction that can reduce their effectiveness.

In a further alternative proposal it has been suggested to incorporate hydrosilylation curable silicone elastomer cross-linkers, e.g., organohydrogenpolysiloxanes in the polycarbonate substrate. However, such a process has been found to have a negative effect on the physical properties of the polycarbonate itself preventing the resin from exerting its own properties. The physical engagement method leaves a possibility that the two segments may be disengaged by physical forces.

The use of silicone elastomers such as self-adhesive silicone elastomers are a preferred alternative as it can give better productivity, quality control and reliability of the parts/articles at least partially due to the removal of the need to use the primer or surface pre-treatments.

The durability of adhesion between the self-adhesive silicone material and a wide variety of non-silicone substrates such as thermoplastic substrates, organic resin substrates metals or thermoplastic and organic resin substrates is of great importance for the use of the combination to be a success but the provision of such composites with good adhesion on various substrates, remains a technical challenge.

The present disclosure relates to a curable silicone elastomer composition that can achieve adhesion on plastic/thermoplastic/resin material substrates, comprising:

(A) one or more organopolysiloxanes containing at least two unsaturated groups per molecule selected from alkenyl groups and alkynyl groups and having a viscosity in a range of 1000 mPa·s to 500,000 mPa·s at 25° C., but which contains no anhydride functionality;

(B) a curing agent comprising (B)(i) an organic peroxide radical initiator; or (B)(ii) a hydrosilylation cure catalyst package comprising a. an organosilicon compound having at least two, alternatively at least three Si—H groups per molecule; and b. hydrosilylation catalyst;

(C) at least one reinforcing and optionally one or more non-reinforcing fillers; and (D) a polyorganosiloxane having (i) at least one unsaturated group per molecule selected from alkenyl groups and alkynyl groups and (ii) an anhydride functionality and an aromatic functionality, wherein a carbon of the aromatic functionality is separated from a carbon of a carbonyl group of the anhydride by a carbon chain of from 1 to 3 non-aromatic carbon atoms inclusive.

This composition above is able to achieve primerless adhesion to plastics with addition-curable silicone elastomers wherein component D is an adhesion promoter which does not contain either Si—H groups and/or alkoxysilane groups that provide primerless adhesion to commercially important engineering thermoplastics.

Component (A) is one or more organopolysiloxanes containing at least two unsaturated groups per molecule selected from alkenyl groups and alkynyl groups and having a viscosity in a range of 1000 mPa·s to 500,000 mPa·s at 25° C., but which contains no anhydride functionality.

In one embodiment, each of the one or more organopolysiloxanes (A) contain at least 2 alkenyl and/or alkynyl groups bonded to a silicon atom per molecule and has a viscosity of from 1000 mPa·s to 500,000 mPa·s at 25° C., alternatively 1000 mPa·s to 150,000 mPa·s at 25° C., alternatively 1000 mPa·s to 100,000 mPa·s at 25° C., alternatively 1000 mPa·s to 75,000 mPa·s at 25° C. using a rheometer such as an Anton-Paar MCR-301 rheometer fitted with a 25 mm cone-and-plate fixture and operated at 25° C. unless otherwise indicated. Unless otherwise noted, viscosities are reported as zero-shear viscosities, meaning the value extrapolated to zero shear rate from the statistically significant, rate-independent Newtonian region of a viscosity vs. shear rate sweep. Alternatively, if desired viscosity may be measured using a Brookfield™ rotational viscometer using Spindle (LV1-LV-4) and adapting the speed according to the polymer viscosity with all viscosity measurements taken at 25° C. unless otherwise indicated.

Each of the at least two unsaturated groups per molecule may be the same or different and is selected from alkenyl groups and alkynyl groups, alternatively alkenyl groups and alkynyl groups having from 2 to 12 carbons, alternatively alkenyl groups and alkynyl groups having from 2 to 6 carbons. Examples of alkenyl groups include vinyl, allyl, butenyl, pentenyl, cyclohexenyl and hexenyl groups. Examples of alkynyl groups include ethynyl, propynyl, butynyl, pentynyl, cyclohexynyl and hexynyl groups. The unsaturated groups may be pendent or terminal or at both positions, that is, they may be present on any of the siloxy units of the organopolysiloxane (A).

Component (A) may be a straight chain and/or branched organopolysiloxane comprising multiple units of the formula (1)

$$R'_aSiO_{4-a/2} \quad (1)$$

wherein each R' may be the same or different and denotes a hydrocarbon group having from 1 to 18 carbon atoms, a substituted hydrocarbon group having from 1 to 18 carbon atoms or a hydrocarbonoxy group having up to 18 carbon atoms and has, on average, a value of from 1 to 3, preferably 1.8 to 2.2.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, trifluoropropyl and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Siloxy units may be described by a shorthand (abbreviated) nomenclature, namely—"M," "D," "T," and "Q", when R is usually an alkyl group unless otherwise indicated, e.g. a methyl group (further teaching on silicone nomenclature may be found in Walter Noll, Chemistry and Technology of Silicones, dated 1962, Chapter I, pages 1-9). The M unit corresponds to a siloxy unit where a=3, that is $R_3SiO_{1/2}$; the D unit corresponds to a siloxy unit where a=2, namely $R_2SiO_{2/2}$; the T unit corresponds to a siloxy unit where a=1, namely $R_1SiO_{3/2}$; the Q unit corresponds to a siloxy unit where a=0, namely $SiO_{4/2}$.

Examples of ingredient (A) are polydiorganosiloxanes containing alkenyl or alkynyl groups but typically alkenyl groups at the two terminals and are represented by the general formula (I):

$$R'R''R'''SiO—(R''R'''SiO)_m—SiOR'''R''R' \quad (I)$$

In formula (I), each R' is an alkenyl or alkynyl group but typically an alkenyl group, which typically contains from 2 to 10 carbon atoms, such as vinyl, allyl, and 5-hexenyl.

R" does not contain ethylenic unsaturation. Each R" may be the same or different and is individually selected from monovalent saturated hydrocarbon radical, which typically contain from 1 to 10 carbon atoms, and monovalent aromatic hydrocarbon radical, which typically contain from 6 to 12 carbon atoms. R" may be unsubstituted or substituted with one or more groups that do not interfere with curing of this inventive composition, such as halogen atoms. R''' is R' or R" and m represents a degree of polymerization suitable for ingredient (A) to have a viscosity within the range discussed below.

Typically, all R" and R''' groups contained in a compound in accordance with formula (I) are methyl groups. Alternatively, at least one R" and/or R''' group in a compound in accordance with formula (I) is methyl and the others are phenyl or 3,3,3-trifluoropropyl. This preference is based on the availability of the reactants typically used to prepare the polydiorganosiloxanes (ingredient (A)) and the desired properties for the cured elastomer prepared from compositions comprising such polydiorganosiloxanes.

Particularly preferred examples of groups R' include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Preferably, at least some and more preferably substantially all of the R' groups are methyl. Some R' groups may be phenyl groups or fluoro groups. In one alternative, the polydiorganosiloxanes are largely polydialkylsiloxanes and/or polydialkylalkylphenylsiloxanes having at least two alkenyl groups per molecule. In a further alternative the polydiorganosiloxanes are largely polydimethylsiloxanes having at least two alkenyl groups per molecule. They are preferably substantially linear materials, which are end-blocked with a siloxane group of the formula $R''_3SiO_2$, wherein each R" is the same or different. It is understood that the cure rate and physical properties of curable composition are impacted by the structure and degree of functionality of component (A). For example, it may be advantageous in some embodiments to utilize branched, resinous or cyclic containing organopolysiloxanes with pendant alkenyl or alkynyl groups as part or all of component (A).

The viscosity of organopolysiloxane (A) at 25° C. is typically determined above using a rheometer or a Brookfield™ rotational viscometer using Spindle (LV-4) and adapting the speed according to the polymer viscosity and all viscosity measurements were taken at 25° C. unless otherwise indicated.

Examples of the organopolysiloxane (A) which may be used include vinyldimethylsiloxy-endblocked dimethylsiloxane-vinylmethylsiloxane copolymer, vinyldimethylsiloxy-endblocked polydimethylsiloxane, vinylmethylhydroxysiloxy-endblocked dimethylsiloxane-vinylmethylsiloxane copolymer, and mixtures thereof.

The organopolysiloxane (A) may be either a single polymer, or a combination of two or more different polymers. Alternatively, or additionally organopolysiloxane (A) may be a silicone resin containing the above defined [T] units and/or [Q] units. For example, the siloxane resins of component (A) may be characterized as DT resins, MQ resins, MDQ resins, etc. but in each case must include at least two unsaturated groups, typically alkenyl groups as discussed above.

The organopolysiloxane (A) is present in the composition at a level of from 10 to 85% by weight based on the total weight of the composition, alternatively 20 to 80% by weight based on the total weight of the composition, alternatively 20 to 75% by weight based on the total weight of the composition, alternatively from 30 to 65% by weight based on the total weight of the composition.

B) Curing Agent

The composition as described herein may be cured with an organic peroxide radical initiator (catalyst) (B)(i) or mixtures of different types of peroxide (radical initiators/catalysts).

The peroxide catalyst/radical initiator may be any of the well-known commercial peroxides used to cure silicone and/or fluorosilicone elastomer compositions. The amount of organic peroxide used is determined by the nature of the curing process, the organic peroxide used, and the composition used. Typically, the amount of organic peroxide utilised in a composition as described herein is from 0.2 to 3 wt. %, alternatively 0.2 to 2% wt. in each case based on the weight of the composition.

Suitable organic peroxides include substituted or unsubstituted dialkyl-, alkylaroyl-, diaroyl-peroxides, e.g. benzoyl peroxide and 2,4-dichlorobenzoyl peroxide, ditertiarybutyl peroxide, dicumyl peroxide, lauroyl peroxide, t-butyl cumyl peroxide, bis(t-butylperoxyisopropyl) benzene, cyclohexanone peroxide, cumene hydroperoxide, tert-butyl hydroperoxide bis(t-butylperoxy)-2,5-dimethyl hexyne, 2,4-dimethyl-2,5-di(t-butylperoxy) hexane, di-t-butyl peroxide, and 2,5-bis(tert-butyl peroxy)-2,5-dimethylhexane.

Alternatively the composition may be cured using a hydrosilylation catalyst package (B)(ii) in the form of (B)(ii)(a) an organosilicon compound having at least 2, alternatively at least 3 Si—H groups per molecule; and (B)(ii)(b) hydrosilylation catalyst.

Component (B)(ii)(a) is a cross-linker in the form of an organosilicon compound containing at least 2 or 3 silicon-bonded hydrogen atoms per molecule. Component (B)(ii)(a) normally contains 3 or more silicon-bonded hydrogen atoms so that the hydrogen atoms can react with the unsaturated alkenyl or alkynyl groups of polymer (A) to form a network structure therewith and thereby cure the composition. Some or all of Component (B)(ii)(a) may alternatively have 2 silicon bonded hydrogen atoms per molecule when polymer (A) has greater than (>) 2 alkenyl or alkynyl groups per molecule.

The structure of the organosilicon compound can be linear, branched, cyclic, or resinous. Cyclosilanes and cyclosiloxanes can have from 3 to 12 silicon atoms, alternatively from 3 to 10 silicon atoms, alternatively from 3 to 4 silicon atoms. In acyclic polysilanes and polysiloxanes, the silicon-bonded hydrogen atoms can be located at terminal, pendant, or at both terminal and pendant positions.

Examples of suitable organohydrogensilanes which might be used as cross-linkers can include diphenylsilane, 2-chloroethylsilane, bis[(p-dimethylsilyl)phenyl]ether, 1,4-dimethyldisilylethane, 1,3,5-tris(dimethylsilyl)benzene, 1,3,5-trimethyl-1,3,5-trisilane, poly(methylsilylene)phenylene, and poly(methylsilylene)methylene. In some examples, the organohydrogensilane can have the formula $HR^1{}_2Si—R^2—SiR^1{}_2H$, wherein $R^1$ is $C_1$ to $C_{10}$ hydrocarbyl or $C_1$ to $C_{10}$ halogen-substituted hydrocarbyl, both free of aliphatic unsaturation, and $R^2$ is a hydrocarbylene group free of aliphatic unsaturation having a formula selected from 1,4- or 1,3-disubstituted phenyl, 4,4'- or 3,3'-disubstituted-1,1'-biphenyl, or para- or meta-disubstituted $Ph(C_gH_{2g})Ph$.

The molecular configuration of the organopolysiloxane containing at least 2 or 3 silicon-bonded hydrogen atoms per molecule (B)(ii)(a) is not specifically restricted, and it can be a straight chain, a straight chain with some branching, cyclic or silicone resin based. While the molecular weight of this component is not specifically restricted, the viscosity is typically from 0.001 to 50 Pa·s at 25° C. either a rheometer as described above or relying on the cup/spindle method of ASTM D 1084 Method B, using the most appropriate spindle from the Brookfield™ RV or LV range for the viscosity range, in order to obtain a good miscibility with polymer (A).

Silicon-bonded organic groups used in component (B)(ii)(a) maybe exemplified by methyl, ethyl, propyl, butenyl, pentenyl, hexyl, or similar alkyl groups; phenyl, tolyl, xylyl, or similar aryl groups; 3-chloropropyl, 3,3,3-trifluoropropyl, or similar halogenated alkyl groups, of which methyl and phenyl groups are preferred.

The organopolysiloxane containing at least 2 or 3 silicon-bonded hydrogen atoms per molecule (B)(ii)(a) is typically added in an amount such that the molar ratio of the total number of the silicon-bonded hydrogen atoms in component (B)(ii)(a) to the total number of alkenyl and/or alkynyl groups in polymer (A) is from 0.5:1 to 20:1. When this ratio is less than 0.5:1, a well-cured composition will not be obtained. When the ratio exceeds 20:1, there is a tendency for the hardness of the cured composition to increase when heated.

Examples of the organopolysiloxane containing at least 2 or 3 silicon-bonded hydrogen atoms per molecule (B)(ii)(a) include but are not limited to:

(a') trimethylsiloxy-terminated methylhydrogenpolysiloxane, (b') trimethylsiloxy-terminatedpolydimethylsiloxane-methylhydrogensiloxane, (c') dimethylhydrogensiloxy-terminated dimethylsiloxane-methylhydrogensiloxane copolymers, (d') dimethylsiloxane-methylhydrogensiloxane cyclic copolymers, (e') copolymers and/or silicon resins consisting of $(CH_3)_2HSiO_{1/2}$ units, $(CH_3)_3SiO_{1/2}$ units and $SiO_{4/2}$ units, (f') copolymers and/or silicone resins consisting of $(CH_3)_2HSiO_{1/2}$ units and $SiO_{4/2}$ units, (g') copolymers and/or silicone resins consisting of $(CH_3)_2HSiO_{1/2}$ units, $SiO_{4/2}$ units and $(C_6H_5)_3SiO_{1/2}$ units, and alternatives in which methyl is replaced by phenyl groups or other alkyl groups.

Alternatively, component (B)(ii)(a) the cross-linker, may be a filler, e.g., silica treated with one of the above.

Component (B)(ii)(a) can be exemplified by the following compounds: a methylhydrogenpolysiloxane capped at both molecular terminals with trimethylsiloxy groups; a copolymer of a methylhydrogensiloxane and a dimethylsiloxane capped at both molecular terminals with trimethylsiloxy groups; dimethylsiloxane capped at both molecular terminals with dimethylhydrogensiloxy groups; a copolymer of a methylhydrogensiloxane and a dimethylsiloxane capped at both molecular terminals with dimethylhydrogensiloxy groups; a copolymer of a methylhydrogensiloxane and a methylphenylsiloxane capped at both molecular terminals with dimethylphenylsiloxy groups; a cyclic methylhydrogenpolysiloxane; a copolymer consisting of $(CH_3)_2HSiO_{1/2}$ siloxane units and $SiO_{4/2}$ units; a copolymer consisting of $(CH_3)_2HSiO_{1/2}$ siloxane units, $(CH_3)_3SiO_{1/2}$ siloxane units, and $SiO_{4/2}$ units, the aforementioned organopolysiloxanes in which a part or all methyl groups are substituted with ethyl, propyl, or similar alkyl groups; phenyl, tolyl, or similar aryl groups; 3,3,3-trifluoropropyl, or similar halogenated alkyl groups; or a mixture of two or more of the aforementioned organopolysiloxanes.

The organosilicon compound cross-linker (B)(ii)(a) is generally present in the curable silicone elastomer composition in an amount such that the ratio of the mole number of silicon-bonded hydrogen atoms of component (B)(ii)(a) to the mole number of alkenyl groups of component (A)

ranges from (0.7:1.0) to (5.0:1.0), preferably from (0.9:1.0) to (2.5:1.0), and most preferably from (0.9:1.0) to (2.0:1.0).

Both the silicon-bonded hydrogen (Si—H) content of component (B)(ii)(a) and the content of the unsaturated groups of component (a) are determined using quantitative infra-red analysis in accordance with ASTM E168. In the present instance, the silicon-bonded hydrogen to alkenyl (vinyl) and/or alkynyl ratio is important when relying on a hydrosilylation cure process. Generally, this is determined by calculating the total weight % of alkenyl groups in the composition, e.g., vinyl [V] and the total weight % of silicon bonded hydrogen [H] in the composition and given the molecular weight of hydrogen is 1 and of vinyl is 27 the molar ratio of silicon bonded hydrogen to vinyl is 27[H]/[V].

Typically dependent on the number of unsaturated groups in component (A) and the number of Si—H groups in component (B)(ii)(a), component (B)(ii)(a) will be present in an amount of from 0.1 to 40% by weight of the total composition, alternatively from 0.5 to 20%, by weight of the total composition alternatively 0.5 to 10% by weight of the total composition, further alternatively from 1% to 5% by weight of the total composition.

Component (B)(ii)(b) is at least one hydrosilylation (addition) reaction catalyst. These are usually selected from catalysts of the platinum metal group (platinum, ruthenium, osmium, rhodium, iridium and palladium), or a compound of one or more of such metals. Platinum and rhodium compounds are preferred due to the high activity level of these catalysts in hydrosilylation reactions. Component (B)(ii)(b) catalyses the reaction between the alkenyl e.g., vinyl groups of component (A) and the Si—H groups of component (B)(ii)(a) resulting in a cross-linked network when the curable silicone elastomer compositions are cured to their respective elastomers.

The catalyst (B)(ii)(b) can be a platinum group metal, a platinum group metal deposited on a carrier, such as activated carbon, metal oxides, such as aluminium oxide or silicon dioxide, silica gel or powdered charcoal, or a compound or complex of a platinum group metal.

Examples of preferred hydrosilylation catalysts (B)(ii)(b) are platinum-based catalysts, for example, platinum black, platinum on various solid supports, chloroplatinic acids, alcohol solutions of chloroplatinic acid, and complexes of chloroplatinic acid with ethylenically unsaturated compounds such as olefins and organosiloxanes containing ethylenically unsaturated silicon-bonded hydrocarbon groups. Soluble platinum compounds that can be used include, for example, the platinum-olefin complexes of the formulae $(PtCl_2 \cdot (olefin))_2$ and $H(PtCl_3 \cdot olefin)$, preference being given in this context to the use of alkenes having 2 to 8 carbon atoms, such as ethylene, propylene, isomers of butene and of octene, or cycloalkanes having 5 to 7 carbon atoms, such as cyclopentene, cyclohexene, and cycloheptene. Other soluble platinum catalysts are, for the sake of example a platinum-cyclopropane complex of the formula $(PtCl_2C_3H_6)_2$, the reaction products of hexachloroplatinic acid with alcohols, ethers, and aldehydes or mixtures thereof, or the reaction product of hexachloroplatinic acid with methylvinylcyclotetrasiloxane in the presence of sodium bicarbonate in ethanolic solution. Platinum catalysts with phosphorus, sulfur, and amine ligands can be used as well, e.g., $(Ph_3P)_2PtCl_2$; and complexes of platinum with vinylsiloxanes, such as sym-divinyltetramethyldisiloxane.

Hence, specific examples of suitable platinum-based catalysts include (i) complexes of chloroplatinic acid with organosiloxanes containing ethylenically unsaturated hydrocarbon groups are described in U.S. Pat. No. 3,419,593;

(ii) chloroplatinic acid, either in hexahydrate form or anhydrous form;

(iii) a platinum-containing catalyst which is obtained by a method comprising reacting chloroplatinic acid with an aliphatically unsaturated organosilicon compound, such as divinyltetramethyldisiloxane;

(iv) alkene-platinum-silyl complexes as described in U.S. Pat. No. 6,605,734 such as $(COD)Pt(SiMeCl_2)_2$ where "COD" is 1,5-cyclooctadiene; and/or (v) Karstedt's catalyst, a platinum divinyl tetramethyl disiloxane complex typically containing about 1 wt. % of platinum in a solvent, such as toluene may be used. These are described in U.S. Pat. Nos. 3,715,334 and 3,814,730.

The hydrosilylation catalyst (B)(ii)(b) of the hydrosilylation curable silicone elastomer composition is present in the total composition in a catalytic amount, i.e., an amount or quantity sufficient to catalyse the addition/hydrosilylation reaction and cure the composition to an elastomeric material under the desired conditions. Varying levels of the hydrosilylation catalyst (B)(ii)(b) can be used to tailor reaction rate and cure kinetics. The catalytic amount of the hydrosilylation catalyst (B)(ii)(b) is generally between 0.01 ppm, and 10,000 parts by weight of platinum-group metal, per million parts (ppm), based on the weight of the composition polymer (A) and filler (C); alternatively, between 0.01 and 5000 ppm; alternatively, between 0.01 and 3,000 ppm, and alternatively between 0.01 and 1,000 ppm. In specific embodiments, the catalytic amount of the catalyst may range from 0.01 to 1,000 ppm, alternatively 0.01 to 750 ppm, alternatively 0.01 to 500 ppm and alternatively 0.01 to 100 ppm of metal based on the weight of the composition. The ranges may relate solely to the metal content within the catalyst or to the catalyst altogether (including its ligands) as specified, but typically these ranges relate solely to the metal content within the catalyst. The catalyst may be added as a single species or as a mixture of two or more different species. Typically, dependent on the form/concentration in which the catalyst package is provided the amount of catalyst present will be within the range of from 0.001 to 3.0 wt. % of the composition.

Component (C) is one or more reinforcing fillers preferably provided in a finely divided form, optionally in combination with one or more and/or non-reinforcing fillers. The reinforcing fillers of component (C) may be exemplified by fumed silica preferably in a finely divided form and/or a precipitated silica preferably in a finely divided form and/or colloidal silicas and/or suitable silicone resins.

Precipitated silica, fumed silica and/or colloidal silicas are particularly preferred because of their relatively high surface area, which is typically at least 50 $m^2/g$ (BET method in accordance with ISO 9277: 2010). Fillers having surface areas of from 50 to 450 $m^2/g$ (BET method in accordance with ISO 9277: 2010), alternatively of from 50 to 300 $m^2/g$ (BET method in accordance with ISO 9277: 2010), are typically used. All these types of silica are commercially available.

When reinforcing filler (C) is naturally hydrophilic (e.g., untreated silica fillers), it is typically treated with a treating agent to render it hydrophobic. The resulting surface modified reinforcing fillers (C) do not clump and can be homogeneously incorporated into organopolysiloxane/polydiorganosiloxane polymer (A), described below, as the surface treatment makes the fillers easily wetted by organopolysiloxane/polydiorganosiloxane polymer (A).

Typically reinforcing filler (C) may be surface treated with any low molecular weight organosilicon compounds disclosed in the art applicable to prevent creping of organosiloxane compositions during processing. For example, organosilanes, polydiorganosiloxanes, or organosilazanes e.g., hexaalkyl disilazane, short chain siloxane diols to render the filler(s) hydrophobic and therefore easier to handle and obtain a homogeneous mixture with the other ingredients. Specific examples include, but are not restricted to, silanol terminated trifluoropropylmethyl siloxane, silanol terminated vinyl methyl (ViMe) siloxane, silanol terminated MePh siloxane, liquid hydroxyldimethyl-terminated polydiorganosiloxane containing an average from 2 to 20 repeating units of diorganosiloxane in each molecule, hydroxyldimethyl terminated Phenylmethyl Siloxane, hexaorganodisiloxanes, such as hexamethyldisiloxane, divinyltetramethyldisiloxane; hexaorganodisilazanes, such as hexamethyldisilazane (HMDZ), divinyltetramethyldisilazane and tetramethyldi(trifluoropropyl) disilazane; hydroxyldimethyl terminated polydimethylmethylvinyl siloxane, octamethyl cyclotetrasiloxane, and silanes including but not limited to methyltrimethoxysilane, dimethyldimethoxysilane, vinyltrimethoxysilane, methyltriethoxysilane, vinyltriethoxysilane, chlrotrimethyl silane, dichlrodimethyl silane, trichloromethyl silane. A small amount of water can be added together with the silica treating agent(s) as processing aid.

The surface treatment may be undertaken prior to introduction in the composition or in situ (i.e., in the presence of at least a portion of the other ingredients of the composition herein by blending these ingredients together at room temperature or above until the filler is completely treated. Typically, untreated reinforcing filler (C) is treated in situ with a treating agent in the presence of polydiorganosiloxane polymer (A) which results in the preparation of a silicone elastomer base material which can subsequently be mixed with other ingredients.

Reinforcing filler (C) is present in an amount of from 5.0 to 40 wt. % of the solids content of the composition, alternatively of from 7.5 to 35 wt. % of the solids content of the composition, alternatively of from 10.0 to 35 wt. % based on the weight % of the solids content of the composition. Hence, the amount of reinforcing filler (C) e.g., finely divided silica and/or silicone resins herein may therefore be for example, from 2.0 to 20 wt. % of the total composition, alternatively of from 2.5 to 15 wt. % of the total composition. In some instances, the amount of reinforcing filler may be of from 5.0 to 15 wt. % based on the weight of the total composition.

Non-reinforcing fillers may optionally be included in component (C) herein. These may include, for the sake of example, crushed quartz, calcium carbonate, diatomaceous earths, barium sulphate, iron oxide, titanium dioxide and carbon black, talc, wollastonite, aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite.

Other non-reinforcing fillers may include, aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3 \cdot 2SiO_2$; kyanite; and $Al_2SiO_5$. Ring silicates may be utilised as non-reinforcing fillers, these include silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$. Sheet silicates may alternatively or additionally be used as non-reinforcing fillers where appropriate group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite. In one alternative the fillers will be selected from one or more of fumed silica, precipitated silica, calcium carbonate, talc, mica, quartz and aluminium oxide.

As previously indicated component (D) as hereinbefore described is a polyorganosiloxane having (i) at least one unsaturated group per molecule selected from alkenyl groups and alkynyl groups and (ii) an anhydride functionality and an aromatic functionality, wherein a carbon of the aromatic functionality is separated from a carbon of a carbonyl group of the anhydride by a carbon chain of from 1 to 3 non-aromatic carbon atoms inclusive.

Component (D) may be prepared as described in accordance with PCT/US20/044709, published as WO 2021/0260055, from the applicants, the content of which is herein incorporated.

Component (D) may have the same general structure as linear or branched organopolysiloxane component (A), i.e., it may be a linear or branched organopolysiloxane and the unsaturated groups of component (D) (i) are the same as the unsaturated groups in component (A); with the exceptions that component (D) may have a viscosity of from 5 to above 100,000 mPa·s at 25° C.; and A proportion of the unsaturated groups in component (A) are replaced by the anhydride functionality of (D) (ii) such that components (D) (i) and (D)(ii) are present.

This is achieved using a functionalization reaction that introduces the anhydride functionality onto the polyorganosiloxane by radical grafting as discussed below.

The anhydride functional group can be added onto a polysiloxane by radical grafting. For example, an alkenyl functional polysiloxane (for example, a vinyl functional polyorganosiloxane) can be combined with an unsaturated anhydride (for example, maleic anhydride) in the presence of a radical initiator and a free radical grafting reaction can occur between the alkenyl group of the polysiloxane and the unsaturated portion of the anhydride so as to graft the anhydride onto the polyorganosiloxane. The reaction is often run with an aromatic initiator and/or in an aromatic solvent, which results in a radical of the initiator and/or solvent also becoming grafted onto the anhydride. In the present application it is required to have both unsaturation and the anhydride group present on the same molecule. In order to ensure that this occurs i.e., a partial conversion closer to 50% to get the average of one anhydride and one vinyl on an end functional siloxane, the process is controlled by using a stoichiometric deficiency of the anhydride reagent relative to the vinyl on the siloxane.

As an example, where: $R^4$ and $R^5$ are alkyl groups and Vi refers to a vinyl group, vinyl functional polyorganosiloxane can be combined with maleic anhydride in an aromatic solvent (such as xylene or toluene) along with a radical initiator such as dibenzoyl peroxide and then heated to initiate a free radical reaction:

$ViR^4_2SiO—(R^5_2SiO)_m—SiR^4_2Vi$ +

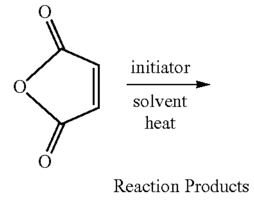

Where a stoichiometric deficiency of the anhydride is utilised the main reaction product resulting is (a) below although some of (b) and (c) may also be present depending on the molar ratio of reactants:

(a) Monofunctionalized polyorganosiloxane: $ViR^4_2SiO—(R^5_2SiO)_m—SiR^4_2A'$ (b) Difunctionalized polyorganosiloxane: $A'R^4_2SiO—(R^5_2SiO)_m—SiR^4_2A'$;

(c) Unreacted vinyl functional polyorganosiloxane: $ViR^4_2SiO—(R^5_2SiO)_m—SiR^4_2Vi$;

and A' is:

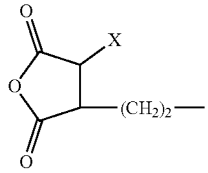

with X being an aromatic group that is a remnant of the solvent (for example, a tolyl or xylyl group) or a remnant of the initiator (for example, a benzoyl group).

In a preferred embodiment the polymeric backbone of the siloxane starting material may be a dimethyl methylalkenyl copolymeric backbone, typically a dimethylmethylvinyl copolymeric backbone, in which case pendent groups A' may be designed to partially replace the pendant alkenyl (vinyl) groups of the starting material. Hence, component (D) may comprise a monofunctionalized polyorganosiloxane of the formula $ViR^4_2SiO—(R^5_2SiO)_m—SiR^4_2A'$ or $A'R^4_2SiO—(R^5_2SiO)_m—SiR^4_2A'$ where each $R^4$ is an alkyl group, each $R^5$ is an alkyl group, an alkenyl group, an alkynyl group or A' and A' is:

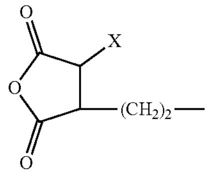

with X being an aromatic group and wherein each molecule comprises at least one alkenyl or alkynyl group. In one embodiment X may be any suitable aromatic group such as for the sake of example but not restricted to is a benzoyl group, a tolyl group or a xylyl group.

The average concentration of anhydride functionality (D) (ii) on the component (D) second polyorganosiloxane can be determined based on the number of reactive sites (for example, alkenyl groups) in the polyorganosiloxane prior to functionalizing with anhydride and then measuring the ratio of anhydride groups to number of reactive sites in component (D). This may be achieved by measuring the number of reactive sites and anhydride groups using $^1H$ nuclear magnetic resonance (NMR) spectroscopy or alternatively by Fourier Transform Infrared (FTIR) spectroscopy. For example, measure the number of reactive sites and anhydride groups using $^1H$ NMR spectroscopy using 1,4-dioxane as an internal standard. The concentration of functionalities such as alkenyl and anhydride can be calculated using the following calculation:

$$C_x=(I_x/I_{is})(N_{is}/N_x)(C_{is})$$

where: $I_x$ is the integral area of the functional group of interest (6.3-5.6 ppm for alkenyl, and 3.5-2.0 ppm for anhydride), $I_{is}$ is the integral area of the internal standard (3.68 ppm), $N_{is}$ is the number of nuclei for the internal standard ($N_{is}$=8 in this instance), $N_x$ is the number of nuclei for the functional group of interest (6 for alkenyl and 5 for anhydride), $C_x$ is the concentration of the functional group of interest and $C_{is}$ is the concentration of the internal standard.

Optional additives may be present in the composition depending on the intended use of the curable silicone elastomer composition. Examples include one or more cure inhibitors, mold releasing agents, peroxides and/or pigments, electrically conductive fillers, thermally conductive fillers, pot life extenders, flame retardants, lubricants, UV light stabilizers, bactericides, wetting agents, heat stabilizers, chain extenders, compression set additives and plasticizers or the like.

Cure inhibitors are used, when required, to prevent or delay the addition-reaction curing process especially during storage. The optional cure (addition-reaction) inhibitors of platinum-based catalysts are well known in the art and include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, and diaziridines. Alkenyl-substituted siloxanes as described in U.S. Pat. No. 3,989,667 may be used, of which cyclic methylvinylsiloxanes are preferred.

One class of known hydrosilylation reaction inhibitor includes the acetylenic compounds disclosed in U.S. Pat. No. 3,445,420. Acetylenic alcohols such as 2-methyl-3-butyn-2-ol constitute a preferred class of inhibitors that will suppress the activity of a platinum-containing catalyst at 25° C. Compositions containing these inhibitors typically require heating at temperature of 70° C. or above to cure at a practical rate.

Examples of acetylenic alcohols and their derivatives include 1-ethynyl-1-cyclohexanol (ETCH), 2-methyl-3-butyn-2-ol, 3-butyn-1-ol, 3-butyn-2-ol, propargyl alcohol, 1-phenyl-2-propyn-1-ol, 3,5-dimethyl-1-hexyn-3-ol, 1-ethynylcyclopentanol, 3-methyl-1-penten-4-yn-3-ol, and mixtures thereof. Derivatives of acetylenic alcohol may include those compounds having at least one silicon atom.

When present, inhibitor concentrations as low as 1 mole of inhibitor per mole of the metal of catalyst will in some instances impart satisfactory storage stability and cure rate. In other instances, inhibitor concentrations of up to 500 moles of inhibitor per mole of the metal of catalyst are required. The optimum concentration for a given inhibitor in a given composition is readily determined by routine experimentation. Dependent on the concentration and form in which the inhibitor selected is provided/available commercially, when present in the composition, the inhibitor is typically present in an amount of from 0.0125 to 10% by weight of the composition.

A dimethylvinyl polydiorganosiloxane having a viscosity of from 10 to 750 mPa·s at 25° C. may additionally be present. Such dimethylvinyl polydiorganosiloxane typically have an analogous structure to component (A), with dimethylvinyl terminal groups a polydimethylsiloxane polymer chain but potentially some vinyl methyl group combination along the length of the polymer chain may be present. In the case of these polymers the main difference is the chain length and consequent viscosity as opposed to component (A) polymers of this type have a zero-shear viscosity of from 10 to 750 mPa·s at 25° C. The zero-shear viscosity is obtained by extrapolating to zero the value taken at low shear rates where the viscosity-shear rate curve is rate-independent, which is a test-method independent value. The zero-shear viscosity of a substance at 25° C. is typically obtained using a rheometer such as an Anton-Paar MCR-301 rheometer fitted with a 25 mm cone-and-plate fixture or a viscometer such as a Brookfield™ rotational viscometer using Spindle (LV-1-LV-4) and adapting the speed according to the polymer viscosity.

Examples of electrically conductive fillers include metal particles, metal oxide particles, metal-coated metallic particles (such as silver-plated nickel), metal coated non-metallic core particles (such as silver coated talc, or mica or quartz) and a combination thereof. Metal particles may be in the form of powder, flakes or filaments, and mixtures or derivatives thereof.

Examples of thermally conductive fillers include boron nitride, alumina, metal oxides (such as zinc oxide, magnesium oxide, and aluminium oxide), graphite, diamond, and mixtures or derivatives thereof.

Examples of chain extender include straight chain organopolysiloxanes containing 2 silicon-bonded hydrogen groups on the terminal position. Such chain extender is different from component (B)(ii)(a) the cross-linker in the form of an organosilicon compound containing at least 2 or 3 silicon-bonded hydrogen atoms per molecule. Typically, the chain extender will have two Si—H groups and the cross-linker will have at least three Si—H groups. Examples of chain extenders include but are not limited to disiloxane or a low molecular weight polyorganosiloxane containing two silicon-bonded hydrogen atoms at the terminal positions. The chain extender typically reacts with the alkenyl radicals of polymers (i) and (ii) thereby linking two or more molecules of polymers (i) and (ii) together and increasing its effective molecular weight and the distance between potential cross-linking sites.

A disiloxane is typically represented by the general formula $(HR^a{}_2Si)_2O$. When the chain extender is a polyorganosiloxane, it has terminal units of the general formula $HR^a{}_2SiO_{1/2}$ and non-terminal units of the formula $R^b{}_2SiO$. In these formulae, Ra and R individually represent unsubstituted or substituted monovalent hydrocarbon radicals that are free of ethylenic unsaturation and fluoro content, which include, but are not limited to alkyl groups containing from 1 to 10 carbon atoms, substituted alkyl groups containing from 1 to 10 carbon atoms such as chloromethyl, cycloalkyl groups containing from 3 to 10 carbon atoms, aryl containing 6 to 10 carbon atoms, alkaryl groups containing 7 to 10 carbon atoms, such as tolyl and xylyl, and aralkyl groups containing 7 to 10 carbon atoms, such as benzyl.

Further examples of chain extenders include tetramethyldihydrogendisiloxane or dimethylhydrogen-terminated polydimethylsiloxane.

A chain extender may be added in an amount from 1 to 10 parts by weight, based on the weight of polymers (i) and (ii), typically 1 to 10 parts per 100 parts of the combination of polymers (i) and (ii).

Examples of flame retardants include aluminium trihydrate, magnesium hydroxide, magnesium silicates, chlorinated paraffins, chlorinated paraffins, hexabromocyclododecane, triphenyl phosphate, dimethyl methylphosphonate, tris(2,3-dibromopropyl) phosphate (brominated tris), and mixtures or derivatives thereof.

Examples of pigments include iron oxides, carbon black, and mixtures or derivatives thereof.

Examples of lubricants include tetrafluoroethylene, resin powder, graphite, fluorinated graphite, talc, boron nitride, fluorine oil, silicone oil, molybdenum disulfide, and mixtures or derivatives thereof.

Further additives include silicone fluids, such as trimethylsilyl or OH terminated siloxanes. Such trimethylsiloxy or OH terminated polydimethylsiloxanes typically have a viscosity<150 mPa·s at 25° C. When present such silicone fluid may be present in the curable silicone elastomer composition in an amount ranging of from 0.1 to 5% weight, based on the total weight of the composition.

The curable silicone elastomer compositions may comprise:

a curable silicone elastomer composition that can achieve significant adhesion on a thermoplastic substrate, on an organic resin substrate or on a thermoplastic and organic resin substrate surface which comprises:

Component A one or more organopolysiloxanes containing at least 2 alkenyl groups per molecule and having a viscosity in a range of 1000 mPa·s to 500,000 mPa·s at 25° C., in an amount of from 10 to 85% by weight based on the total weight of the composition, alternatively 20 to 80% by weight based on the total weight of the composition, alternatively 20 to 75% by weight based on the total weight of the composition, alternatively from 30 to 65% by weight based on the total weight of the composition;

Component B

When component (B) is (B)(i) the organo peroxide may be present in an amount of from 0.2 to 3% wt., alternatively 0.2 to 2% wt. in each case based on the weight of the composition.

Alternatively, Component (B)(ii)(a) an organopolysiloxane containing at least 2 or 3 silicon-bonded hydrogen atoms per molecule, in an amount of 0.1-40% weight of the total composition, alternatively from 0.5 to 20%, by weight of the total composition alternatively 0.5 to 10% by weight of the total composition, further alternatively from 1% to 5% by weight of the total composition;

Component (B)(ii)(b), at least one hydrosilylation catalyst, in an amount of 0.01-10% by weight of the total composition, alternatively 0.01% to 5% by weight of the total composition, further alternatively from 0.05% to 2% by weight of the total composition;

Component (C), at least one reinforcing and optionally one or more non-reinforcing fillers in an amount of from 1 to 80% by weight, based on the total weight of the composition, alternatively from 1 to 50% by weight, based on the total weight of the composition, alternatively 5 to 50% by weight, based on the total weight of the composition, further alternatively from 8 to 30% by weight, based on the total weight of the composition;

There is also comprise component (D).

This disclosure is intended to include any of the above combinations providing the total % composition of components (A) to (D) and any optional additives make up 100 wt. % by weight of the composition.

When cured via hydrosilylation, it is important for the catalyst (B)(ii)(b) to be stored separately from cross-linker (B)(ii)(a) to prevent premature cure during storage. Typically, the catalyst (B)(ii)(b) is included in the part A composition and the cross-linker (B)(ii)(a) and any optional inhibitor are stored in part B composition.

The optional additives (excluding the inhibitor) may be in either part (A) or part (B) or in both parts. They may also be added into the final mixture after parts (A) or part (B) have been combined.

In one embodiment, there is provided a process for preparing an article or a composite part of an article comprising a) forming a mixture of the curable silicone elastomer composition described herein, and
b) applying the mixture onto a surface of a substrate, optionally after the substrate has been surface treated by e.g., plasma, corona and/or UV-C;
c) curing the mixture at a temperature of from 80 to 250° C.

In step (a) when the composition is stored in multiple parts before use, the different parts are combined together and homogeneously mixed, with the optional subsequent step of the addition of any additional additive as may be required by the final use of the composition.

The substrate may be any suitable thermoplastic or organic resin substrates Examples of substrates include acrylonitrile-butadiene-styrene, polyphenylene/styrene blends, polystyrenes, polycarbonates (PC), polyurethane, styrene resin, polyethylene, polypropylene, acrylic, polyacrylates, polymethacrylates, polyacrylamides, polyesters, polyethylene terephthalate, polybutylene terephthalate (PBT), polyphenylene oxide, polyphenylene sulfide, polysulfone, nylon, polyamide (PA), blends of polyamide resins with syndiotactic polystyrene, polyimide, fluoropolymers, and liquid crystal resin, non-resin containing polyetherimides; phenolic resins, epoxy resins, epoxy mold compounds urea resins, melamine resins, alkyd resins, acrylonitrile-butadiene-styrenes, styrene-modified poly(phenylene oxides), poly(phenylene sulfides), vinyl esters or polyphthalamides and combinations thereof. Other substrates may include for the sake of example, metals, cellulosics, and fabrics/textiles e.g., on cotton or other natural and synthetic fiber garments. Any of the above may be activated if desired, e.g., plasma, corona or UV-C activated. Typically, when the composition is not of a self-adhesive type the composition herein may be adhered to metal substrates e.g., silicon, aluminium, stainless steel alloys, titanium, copper, nickel, silver, gold, and combinations thereof.

The homogeneous mixing of the components of the present curable silicone elastomer composition may be undertaken by using a suitable mixing means such as a kneader mixer, a Z-blade mixer, a two-roll mill (open mill), a three roll mill, a Haake™ Rheomix OS Lab mixer, a screw extruder or a twin-screw extruder or the like. Speed mixers as sold by e.g., Hauschild and as DC 150.1 FV, DAC 400 FVZ or DAC 600 FVZ, may alternatively be used.

The curable silicone elastomer compositions may be processed (or cured) by injection moulding, press moulding, extrusion moulding, transfer moulding, press vulcanization, calendaring.

Curing can for example take place in a mold to form a moulded silicone article adhered to an e.g., polycarbonate substrate. The curable silicone elastomer composition may for example be injection moulded to form an article adhered to the polycarbonate material, or the composition can be overmolded by injection moulding around thermoplastic substrates, organic resin substrates or thermoplastic and organic resin substrates or articles or over a thermoplastic substrate, organic resin substrate or thermoplastic and organic resin substrate. When cured in presence of a heat sensitive substrate, the curable silicone elastomer compositions as hereinbefore described is cured under such conditions enabling development of mechanical adhesion with the heat sensitive substrate and the like, and more specifically, by using a temperature and curing time at which the heat sensitive substrate is not deformed, melted, or denatured.

The curable silicone elastomer composition may be cured into silicone elastomer articles which are adhered to thermoplastic substrates, organic resin substrates or thermoplastic and organic resin substrates, for example, tubes, strips, solid cord or custom profiles according to the size specifications of the manufacturer.

The curable silicone elastomer composition as hereinbefore described may be applied to the surface of the substrate by any suitable means such as rolling, spreading, 3-D printing and the like, and cured as described above. After application of the curable silicone elastomer composition onto the substrate, the composition is cured at the cure temperature ranging between 80° C. and 250° C. Such temperatures are generally determined by the materials involved. In the case of 3-D printing the 3D printer may be selected from a fused filament fabrication printer, a selective laser sintering printer, a selective laser melting printer, a stereolithography printer, a powder bed (binder jet) printer, a material jet printer, a direct metal laser sintering printer, an electron beam melting printer, a laminated object manufacturing deposition printer, a directed energy deposition printer, a laser powder forming printer, a polyjet printer, an ink-jetting printer, a material jetting printer, and a syringe extrusion printer.

In one embodiment herein there is provided an article consisting of a silicone elastomer cured from curable silicone elastomer composition as hereinbefore described or consisting of a silicone elastomer cured from curable silicone elastomer composition on a rigid or flexible substrate such as the type described above.

In another embodiment there is provided a composite part comprising a silicone elastomer cured from the curable silicone elastomer composition as hereinbefore described as described above on a rigid or flexible substrate. It is to be understood that such composite parts include those constructions where any of a substrate and a silicone elastomer are used as an integral component in an article. Examples of substrates as described above.

In one embodiment, there is provided an article or composite part comprising an elastomeric material generated from the curable silicone elastomer composition above adhered to a thermoplastic substrate, organic resin substrate or thermoplastic and organic resin substrate such as described above.

In another embodiment the curable silicone elastomer composition as hereinbefore described may be applied to the surface of the substrate be processed using a 3D printing method. A typical method of forming a three-dimensional (3D) article may comprise multiple steps. For example, the method may comprise (i) providing a thermoplastic substrate, organic resin substrate or thermoplastic and organic resin substrate. The method may further comprise (ii) heating the substrate. In addition, the method may comprise (iii) printing a curable silicone elastomer composition as hereinbefore described on the substrate with a 3D printer to form a subsequent layer. Optionally, the latter step may be repeated if required to apply one or more further layers.

Examples of such articles or composite parts, in the case of all of the above can be found in various industries including, but not limited to, automotive applications, medical applications, consumer and industrial applications, electronic applications. In automotive applications, this may include housings with a silicone seal or gasket, plugs and connectors, components of various sensors, membranes, diaphragms, climate venting components, and the like. Electronic applications may include mobile phone cover seals, mobile phone accessories, precision electronic equipment, electrical switches and switch covers, watches and wristbands, wearable apparatus, e.g., facemasks, wearable electronic devices, and the like; telecommunications equipment, gaming machines, clocks, image receivers, DVD equipment, MD equipment, CD equipment, and other precision electronic equipment, microwave ovens, refrigerators, electric rice cookers, TVs, thin displays of liquid crystal TVs and plasma TVs, various home appliance, copying machines, printers, facsimile machines, and other office automation (OA) equipment, connector seals, spark plug caps, components of various sensors, and other automobile components.

EXAMPLES

All viscosities in the following examples were measured using a All viscosities in the following examples were measured using a rheometer such as an Anton-Paar MCR-301 rheometer fitted with a 25 mm cone-and-plate fixture and operated at 25° C. unless otherwise indicated. Unless otherwise noted, viscosities are reported as zero-shear viscosities, meaning the value extrapolated to zero shear rate from the statistically significant, rate-independent Newtonian region of a viscosity vs. shear rate sweep. The wt. % of vinyl and Si—H were determined using quantitative infrared analysis in accordance with ASTM E168. In the first series of Examples, a Reference Example and 3 examples were provided using compositions containing the following ingredients:

TABLE 1 ingredients

| Ingredient | Description |
|---|---|
| Polymer 1 | Dimethylvinylsiloxy-terminated Dimethyl Siloxane, 0.085 wt. % Vinyl (Vi), zero shear viscosity 57000 mPa · s |
| Polymer 2 | Dimethylvinylsiloxy-terminated Dimethyl, Methylvinyl Siloxane, vinyl content of 1.1 wt. % and a viscosity of about 400 mPa · s |
| Polymer 3 | Tetramethyltetravinylcyclotetrasiloxane |
| Polymer 4 | Dimethyl Hydroxy-terminated Dimethyl Siloxane, zero shear viscosity of viscosity 40 mPa · s |
| Treated filler | In situ hydrophobically treated fumed silica |
| Cross-linker 1 | Dimethyl, Methylhydrogen Siloxane with Methyl Silsesquioxane Si-H content of 0.84, and with zero shear viscosity of 15 mPa · s |
| Cross-linker 2 | Trimethylsiloxy-terminated Dimethyl, Methylhydrogen Siloxane, Si-H content of 0.776 wt. %, and viscosity of about 5 mPa · s |
| Catalyst | Karstedt's (Platinum) catalyst in dimethyl siloxane, dimethylvinylsiloxy terminated (0.42 wt. % Vi, 400 mPa · s |
| Inhibitor | 3.5 wt. % Ethynyl Cyclohexanol (ETCH) in Polymer 2 |

The treated filler was fumed silica sold under the trade name CAB-O-SIL™ S-17D by the Cabot Corporation treated with hexamethyldisilazane (HMDZ) and tetramethyldivinyldisilazane.

Four alternative adhesion promoters were utilised in the following first series of examples. They were prepared in accordance with the method described in PCT/US20/044709, published as WO 2021/0260055:

Adhesion Promoter 1: Reaction product of $ViR^4_2SiO—(R^5_2SiO)_m—SiR^4_2Vi$ in which $R^4$ and $R^5$ are methyl and the average value of m is 177 with maleic anhydride (MAH) and AH and benzoyl peroxide (BPO), in m-xylene, the resulting product had an equivalent wt. of vinyl (g/mol Vi) of 9600 and an equivalent wt. of anhydride (g/mol anhydride) of 22,000.

Adhesion Promoter 2 Reaction product of $ViR^4_2SiO—(R^5_2SiO)_m—SiR^4_2Vi$ in which $R^4$ and $R^5$ are methyl and the average value of m is 46 with maleic anhydride and benzoyl peroxide (BPO), in m-xylene, the resulting product had an equivalent wt. of vinyl (g/mol Vi) of 3700 and an equivalent wt. of anhydride (g/mol anhydride) of 3900.

Adhesion Promoter 3 Reaction product of $ViR^4_2SiO—(R^5_2SiO)_m—SiR^4_2Vi$ in which $R^4$ and $R^5$ are methyl and the average value of m is 7 with maleic anhydride and benzoyl peroxide (BPO), in m-xylene, the resulting product had an equivalent wt. of vinyl (g/mol Vi) of 1000 and an equivalent wt. of anhydride (g/mol anhydride) of 860.

Adhesion Promoter 4 is further example using the starting ingredients identified for Adhesion promoter 3 but using reduced ratio of MAH:Vi than was used for Additive 3. resulting with an equivalent wt. of vinyl (g/mol Vi) of 590 and an equivalent wt. of anhydride (g/mol anhydride) of 1400.

In the above the estimate of the average value of m was determined from the number average molecular weight (Mn) of the polymer peak obtained by GPC in a solvent such as toluene calibrated with polystyrene standards by using the following formula. by using the following formula:

$$n=[Mn-2*FW(M(R^4_2Vi))]/FW(D(R^5_2))$$

where FW denotes the formula weight of the structural group in brackets, with Mn, and all FW reported in g/mol. For instance, for a vinyl terminated PDMS of structure $M^{Vi}$-$D_n$-$M^{Vi}$, $$n=[Mn-2*(93.202)]/74.16$$

The equivalent weight of vinyl (EW(Vi)) is again determined from the number average molecular weight (Mn) of the polymer peak obtained by GPC in a solvent such as toluene calibrated with polystyrene standards and is determined using the following formula $$EW(Vi)=Mn/(v+y)$$

The equivalent weight of anhydride (EW(anh)) is given as follows: EW(anh)=Mn/(x+z)

The seven different compositions assessed were prepared by making the part A compositions and then the part B compositions and subsequently mixing the part A and part B compositions in a 1:1 weight ratio.

TABLE 2

| Part A composition (wt. %) | | | | |
|---|---|---|---|---|
| Component | Ref. | Ex. 1 | Ex. 2 | Ex. 3 |
| Polymer 1 | 67.00 | 53.53 | 64.30 | 64.30 |
| Polymer 2 | 3.53 | 2.82 | 3.38 | 3.38 |
| Polymer 3 | 0.15 | 0.12 | 0.15 | 0.15 |
| Polymer 4 | 1.07 | 0.85 | 1.02 | 1.02 |
| Treated filler | 27.90 | 22.30 | 26.78 | 26.78 |
| Catalyst | 0.36 | 0.28 | 0.34 | 0.34 |
| Adhesion Promoter 1 | | | | |
| Adhesion Promoter 2 | | 20.09 | | |
| Adhesion Promoter 3 | | | 4.02 | |
| Adhesion Promoter 4 | | | | 4.02 |

Adhesion promoters 1 and 2 were added directly into Part A. Adhesion promoters 3 and 4 were found to be solids and were therefore solubilized in an equivalent of acetone, which was then mixed into the Part A composition. The acetone was then allowed to evaporate.

The part A composition was prepared using a Flacktek Speedmixer® the ingredients were added into a polypropylene dental cup and then the mixture was mixed at 2000 rpm for 20 seconds, followed by hand scraping and mixing. The sample was mixed at 2000 rpm for a further 20 seconds, followed by hand scraping and mixing and then for a final mixing at 2000 rpm for 20 seconds.

TABLE 3

| Part B composition (wt. %) | | | | |
|---|---|---|---|---|
| Component | Ref. 1 | Ex. 1 | Ex. 2 | Ex. 3 |
| Polymer 1 | 61.23 | 60.55 | 60.80 | 60.48 |
| Polymer 2 | 1.53 | 1.51 | 1.52 | 1.51 |
| Cross-linker 1 | 1.99 | 1.97 | 1.98 | 1.97 |
| Cross-linker 2 | | 1.10 | 0.69 | 1.22 |
| Polymer 4 | 1.02 | 1.01 | 1.01 | 1.00 |
| Treated filler | 31.89 | 31.54 | 31.67 | 31.50 |
| Inhibitor | 2.34 | 2.32 | 2.33 | 2.31 |

A similar mixing protocol was employed for mixing Part B, as was used for the part A composition. Subsequently Parts A and B were mixed together in a 1:1 weight ratio.

The different compositions prepared once the part A and part B compositions had been mixed together were applied onto two substrates.

Substrate 1 (S. 1) was a polybutylene terephthalate (PBT) sold under the tradename Ultradur™ B4300G4 by BASF (20% glass fibers); and In each instance the respective substrate was wiped with isopropyl alcohol (IPA) and air-dried prior to application of the prepared composition. In each case the prepared composition was then applied onto the substrate at a thickness of 25 mils (0.0635 cm). Subsequently, the silicone composition was cured in a forced air oven at 150° C. for 1 hour. Using a razor blade, two perpendicular lines separated by roughly the width of the spatula blade were etched across the width of the substrate and through the depth of cured material down to the substrate surface. Force was applied manually to the material between the cuts by the spatula held down at approximately an angle of 30° from the substrate surface. Adhesion (or lack of adhesion) was then subjectively assessed.

TABLE 4

| Tested Property Results. | | | |
|---|---|---|---|
| | Mmol anhydride/100 g of total formulation | Mmol anhydride/100 g of total matrix | Adhesion on S. 1 |
| Ref. 1 | — | — | - |
| Ex. 1 | 2.56 | 3.53 | + |
| Ex. 2 | 2.32 | 3.30 | + |
| Ex. 3 | 1.43 | 2.02 | + |

For the avoidance of doubt in the above and following tables etc., when referring to the total composition this is relative to everything shown in the ingredients table. When referring to the matrix we are discussing the unfilled composition (total composition minus treated filler).

In Table 4 the indication (−) poor adhesion=adhesive failure (separation from the substrate) and +) moderate to good adhesion=mixed mode failure [cohesive failure (tear in the elastomer) and adhesive failure].

The tables above show the pronounced effect of the anhydride-grafted additives in the compositions of this invention relative to those which don't have adequate levels of anhydride functionality. Note additives that have low anhydride content (or higher equivalent weight of anhydride EWanh) will require commensurately higher concentrations in wt. % to be effective. For example, adhesion promoter 1 (EWanh=22,000 g/mol) will requires far higher concentrations (beyond what was tested) in the LSR formulation than adhesion promoter 2 (EWanh=3900 g/mol) and adhesion promoter 3 (EWanh=860 g/mol) to be effective as an adhesion promoter in this formulation.

A second series of examples were produced using alternative compositions. Components not previously identified are shown in Table 5 below and the compositions per se are depicted in Table 6.

TABLE 5

| Additional ingredients not used in previous examples | |
|---|---|
| Component | Description |
| Filler 1 | RA-0127 Silver Flake from Metalor Technologies, a 3.97 μm average (D50) particle size |
| Filler 2 | Conduct-O-Fil ™ SA300S20 silver-coated aluminum granules from Potters Industries, 40 μm average particle size (diameter) |
| Filler 3 | Conduct-O-Fil ™ S2429-S silver-coated solid glass spheres from Potters Industries average diameter 89 μm average particle size (diameter) |
| Polymer 5 | Vinyl MQ resin in dimethylvinylsiloxy terminated dimethyl siloxane having an average viscosity of about 5,400 mPa · s |
| Polymer 6 | Vinyldimethyl terminated polydimethylsiloxane having a viscosity of about 1949 mPa · s |
| Silane 1 | Reaction product of 3-glycidoxypropyltrimethoxysilane and an oligomeric random copolymer diol of poly(methylvinylsiloxane-dimethylsiloxane) with a post-reacted vinyl content of 6 wt. % Vi and a zero-shear viscosity of 15 mPa-s at 25° C. |
| Silane 2 | 1,6-bis(trimethoxysilyl) hexane |
| Platinum Catalyst 2 | 1,3,-diethyl-1,1,3,3-tetramethyldisiloxane platinum complex (2 wt. % Pt). |
| Inhibitor solution 1 | A solution of 10% of polymer 3 diluted in Polymer 4. |
| Catalyst Solution 1 | A solution of 10% Platinum Catalyst 2 diluted in Polymer 4. |

In this case adhesion promoter 1 as described above was utilised as adhesion promoter and was compared with the corresponding polymeric starting material for making adhesion promoter 1, namely $ViMe_2SiO[Me_2SiO]_{177}SiMe_2Vi$ having a viscosity of about 443 mPa·s, referred to below as Anhydride-free additive. The particle size information regarding fillers 1, 2 and 3 is taken from the supplier datasheets.

The tables below list the sample formulations for Part I showing grams (g) of each component (table 3) and the calculated anhydride mmol concentration per 100 g of total formulation and matrix component (table 4).

TABLE 6

| Formulations for the electrically conductive formulations Ref. 2, C. 1, 2 and Ex. 4 to 7. | Ref. 2 | C. 1 | C. 2 | Ex. 4 | Ex. 5 | Ex. 6 | Ex. 7 |
|---|---|---|---|---|---|---|---|
| Adhesion Promoter (AP) | None | 2 | 1 | 1 | 1 | 1 | 1 |
| AP (g) | 0 | 0.4 | 0.04 | 0.2 | 0.4 | 0.6 | 0.8 |
| AP (wt. %) | 0 | 1.0 | 0.1 | 0.5 | 1.0 | 1.5 | 2.0 |
| Polymer 1 (g) | 5.11 | 4.858 | 5.084 | 4.984 | 4.858 | 4.732 | 4.607 |
| Polymer 2 (g) | 1.278 | 1.215 | 1.271 | 1.246 | 1.215 | 1.183 | 1.152 |
| Silane 1 (g) | 0.406 | 0.386 | 0.404 | 0.396 | 0.386 | 0.376 | 0.366 |
| Silane 2 (g) | 0.041 | 0.039 | 0.041 | 0.04 | 0.039 | 0.038 | 0.037 |
| Cross-linker (g) | 0.573 | 0.545 | 0.57 | 0.559 | 0.545 | 0.531 | 0.516 |
| Inhibitor (g) | 0.445 | 0.423 | 0.443 | 0.434 | 0.423 | 0.412 | 0.401 |
| Catalyst (g) | 0.276 | 0.262 | 0.275 | 0.269 | 0.262 | 0.256 | 0.249 |
| Filler 1 (g) | 3.822 | 3.822 | 3.822 | 3.822 | 3.822 | 3.822 | 3.822 |
| Filler 2 (g) | 19.11 | 19.11 | 19.11 | 19.11 | 19.11 | 19.11 | 19.11 |
| Filler 3 (g) | 8.941 | 8.941 | 8.941 | 8.941 | 8.941 | 8.941 | 8.941 |

Preparation of Samples. In a dental cup, prepare the "inhibitor solution 1" and "catalyst solution 1" shown below:

Inhibitor Solution 1

Prepare samples of the Inhibitor Solution 1 in a dental cup by first adding 2.00 g of Inhibitor 1, followed by 18.00 g of Polymer 2. The added components were then mixed at 2000 revolutions per minute (rpm) for 30 seconds.

Catalyst Solution 1

Prepare samples of the Catalyst Solution 1 in a dental cup by first adding 2.00 g of Platinum Catalyst 1, followed by 18.00 g of Polymer 2. The added components were then mixed at 200 revolutions per minute (rpm) for 30 seconds.

Preparation of Formulations

In a dental cup, add the desired amounts of Polymer 1, Polymer 2, Additive 1 or 2 (where it applies), Silane 1, Silane 2, and Filler 1. Gently hand mix and dental mix once for 30 seconds at 1600 revolutions per minute (rpm). Add Filler 2. Gently hand mix and dental mix once for 30 seconds at 1600 revolutions per minute (rpm). Add Filler 3. Gently hand mix and dental mix for 30 seconds at 1600 revolutions per minute (rpm) twice. Add the desired amount of Inhibitor Solution 1 and Crosslinker 1. Gently hand mix and dental mix once for 30 seconds at 1600 revolutions per minute (rpm). Add the desired amount of Catalyst Solution 1. Gently hand mix and dental mix once for 30 seconds at 1600 revolutions per minute (rpm) to obtain the final sample.

TABLE 7

Calculated mmol of the anhydride in the overall formulation and relative to the matrix component using the calculation described below.

| | Ref. 2 | C. 5 | C. 6 | Ex. 4 | Ex. 5 | Ex. 6 | Ex. 7 |
|---|---|---|---|---|---|---|---|
| Adhesion Promoter (AP) | None | 2 | 1 | 1 | 1 | 1 | 1 |
| AP (g) | 0 | 0.4 | 0.04 | 0.2 | 0.4 | 0.6 | 0.8 |
| AP (wt. %) | 0 | 1.0 | 0.1 | 0.5 | 1.0 | 1.5 | 2.0 |
| wt. % Additive (of total composition) | 0 | 0 | 0.1 | 0.5 | 1.0 | 1.5 | 2.0 |
| mmol Anhydride/100 g (of total composition) | NA | NA | 0.005 | 0.023 | 0.045 | 0.068 | 0.091 |
| wt. % Additive (of total matrix) | 0 | 4.921 | 0.492 | 2.461 | 4.921 | 7.382 | 9.843 |
| mmol Anhydride/100 g total matrix | NA | NA | 0.022 | 0.112 | 0.224 | 0.336 | 0.447 |
| Cohesive failure to substrate (indicated by a +) | − | − | − | + | + | + | + |

Description of Calculation for mmol of Anhydride: mmol anhydride was calculated by dividing the number of grams of the anhydride-grafted additive (e.g., a maleic anhydride grafted additive) in 100 g of the formulation or in 100 g of the matrix component (unfilled) itself (as shown in the table) by 22000 g/mol (for additive 1) and then multiplying this by 1000.

A filmic polyester release liner with a fluorinated coating on the other (3M™ 9956 Medical Release Liner, Polyester, Fluoropolymer was used as a substrate for curing the samples in-between two sheets where the polyester side of the substrate was exposed to the sample. Each composition from Table 6 above was applied on to the substrate surface and after the sandwiched material was cured at 150° C. for 1 hour was evaluated for relative adhesion strength by determining whether cohesive failure resulted from a peel test. The results show that the control formulation with no additive 1 (reference 1), the formulation with an additive containing no anhydride functionality (additive 2, C. 1), as well as the formulation containing 0.1 wt. % additive 1 (C. 22) show adhesive failure. Formulations with between 0.5 and 2 wt. % additive 1 show cohesive failure indicating improved relative adhesion to the substrate. This surprising result prompted the previous example with the LSR demonstrating that adhesion to plastic and other substrates can be improved using component (D) as described herein. These examples demonstrate that this also is achievable using filled siloxane systems, for example electrically conductive composites.

The peel test was conducted at room temperature on the cured samples by manually peeling the two sheets apart to determine whether cohesive failure resulted.

The invention claimed is:

1. A curable silicone elastomer composition that can achieve adhesion on suitable material substrates, the composition comprising:

(A) one or more organopolysiloxanes containing at least two unsaturated groups per molecule selected from alkenyl groups and alkynyl groups and having a viscosity in a range of 1,000 mPa·s to 500,000 mPa·s at 25°, but which contains no anhydride functionality;

(B) a curing agent comprising:

(B)(i) an organic peroxide radical initiator; or (B)(ii) a hydrosilylation cure catalyst package comprising:

a) an organosilicon compound having at least two, optionally at least three, Si—H groups per molecule; and b) a hydrosilylation catalyst;

(C) at least one reinforcing filler, and optionally one or more non-reinforcing fillers; and (D) a polyorganosiloxane having:

(i) at least one unsaturated group per molecule selected from alkenyl groups and alkynyl groups; and (ii) an anhydride functionality and an aromatic functionality, wherein a carbon of the aromatic functionality is separated from a carbon of a carbonyl group of the anhydride by a carbon chain of from 1 to 3 non-aromatic carbon atoms inclusive.

2. The curable silicone elastomer composition in accordance with claim 1, wherein component (D) comprises a monofunctionalized polyorganosiloxane of the formula $ViR^4{}_2SiO—(R^5{}_2SiO)_m—SiR^4{}_2A'$ or the formula $A'R^4{}_2SiO—(R^5{}_2SiO)_m—SiR^4{}_2A'$ where each $R^4$ is an alkyl group, each $R^5$ is an alkyl group, an alkenyl group, an alkynyl group or A' and where A' is:

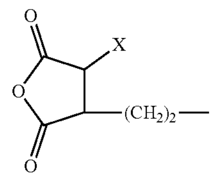

with X being an aromatic group and wherein each molecule comprises at least one alkenyl or alkynyl group.

3. The curable silicone elastomer composition in accordance with claim 2, wherein in component (D), X is a benzoyl group, a tolyl group or a xylyl group.

4. The curable silicone elastomer composition in accordance with claim 1, wherein component (D) is added to the composition in an amount of from 0.5 to 5% by weight of the total composition of the other ingredients.

5. The curable silicone elastomer composition in accordance with claim 1, wherein the composition comprises a cure inhibitor.

6. The curable silicone elastomer composition in accordance with claim 1, which is stored before use in at least 2 separate parts.

7. A process for preparing an article or a composite part of an article, the process comprising:

a) forming a mixture of the curable silicone elastomer composition according to claim 1;

b) applying the mixture onto a surface of a substrate; and c) curing the mixture at a temperature of from 80 to 250° C.

8. The process in accordance with claim 7, wherein the substrate is polycarbonate.

9. An article cured from the curable silicone elastomer composition according to claim 1.

10. An article comprising a silicone elastomer cured from the curable silicone elastomer composition in accordance with claim 1 adhered to a plastic substrate.

11. An article comprising a silicone elastomer cured from the curable silicone elastomer composition in accordance with claim 1 adhered to a thermoplastic substrate, an organic resin substrate or a thermoplastic and an organic resin substrate.

12. The article in accordance with claim 9, selected from housings with a silicone seal or gasket, plugs and connectors, components of sensors, membranes, diaphragms, climate venting components, personal electronic equipment, mobile phone cover seals, mobile phone accessories, precision electronic equipment, electrical switches and switch covers, watches and wristbands or wearable electronic devices.

13. A composite part comprising a silicone elastomer cured from the curable silicone elastomer composition according to claim 1 on a plastic/thermoplastic/resin material substrate, optionally on a polycarbonate substrate.

14. The composite part in accordance with claim 13, selected from housings with a silicone seal or gasket, plugs and connectors, components of sensors, membranes, diaphragms, climate venting components, personal electronic equipment, mobile phone cover seals, mobile phone accessories, precision electronic equipment, electrical switches and switch covers, watches and wristbands, wearable apparatuses and/or wearable electronic devices, parts of mobile phones, mobile telecommunications equipment, gaming machines, clocks, image receivers, DVD equipment, MD equipment, CD equipment, precision electronic equipment, microwave ovens, refrigerators, electric rice cookers, cathode ray TVs, thin displays of liquid crystal TVs and plasma TVs, home appliances, copying machines, printers, facsimile machines, OA equipment, connector seals, spark plug caps, components of sensors, and automobile components.

15. The curable silicone elastomer composition in accordance with claim 1, wherein component (C) comprises reinforcing filler and non-reinforcing filler.

* * * * *